US007805024B2

(12) United States Patent
Wu

(10) Patent No.: US 7,805,024 B2
(45) Date of Patent: Sep. 28, 2010

(54) METHOD AND APPARATUS TO PROVIDE EFFICIENT MULTIMEDIA CONTENT STORAGE

(75) Inventor: Tao Wu, Woburn, MA (US)

(73) Assignee: Nokia Corporation, Espoo (FI)

( * ) Notice: Subject to any disclaimer, the term of this patent is extended or adjusted under 35 U.S.C. 154(b) by 1199 days.

(21) Appl. No.: 10/839,672

(22) Filed: May 5, 2004

(65) Prior Publication Data
US 2005/0262543 A1 Nov. 24, 2005

(51) Int. Cl.
*G06K 9/54* (2006.01)
*G06K 9/60* (2006.01)
*G06K 9/00* (2006.01)
*G06K 9/62* (2006.01)
*G06K 9/46* (2006.01)
*H04N 1/00* (2006.01)
*H04N 7/12* (2006.01)
*H04N 11/02* (2006.01)
*H04N 11/04* (2006.01)
*G06T 9/00* (2006.01)

(52) U.S. Cl. .................. 382/305; 382/181; 382/209; 382/232; 382/243; 358/403; 345/555; 348/390.1

(58) Field of Classification Search ............... 382/236, 382/239, 305; 348/231.2, 231.99, 231.1, 348/231.5
See application file for complete search history.

(56) References Cited

U.S. PATENT DOCUMENTS 5,687,095 A * 11/1997 Haskell et al. ........... 348/386.1
6,081,551 A * 6/2000 Etoh ........................ 375/240
6,148,031 A    11/2000 Kato ...................... 375/240.13

(Continued)

FOREIGN PATENT DOCUMENTS

EP      1 170 953 A2    6/2001

(Continued)

OTHER PUBLICATIONS

"MPEG Digital Viedeo-Coding Standards", IEEE Signal Processing Magazine, Sep. 1997, pp. 82-99.

(Continued)

*Primary Examiner*—Anand Bhatnagar
*Assistant Examiner*—Jose M Torres
(74) *Attorney, Agent, or Firm*—Harrington & Smith

(57) ABSTRACT

Disclosed is a method and a device, that includes a programmed data processor, to process image data. The method includes, for a plurality n of files each containing image data representing one of n images, selecting one file as a base file; selecting as a target file an image data file that is contextually-related file to the base file; comparing the target file and the base file to determine differences therebetween; and storing the target file as a reduced file that is a representation of differences between the image data of the target file and the image data of the base file. An image data file is selected as being contextually-related to the base file based on at least an image capture location, and/or on an image capture time, or based on a user input. Storing can be performed in a memory device that is a part of a wireless communications device, such as a cellular telephone or a personal communicator that includes a digital camera, such as a camera phone.

37 Claims, 2 Drawing Sheets

U.S. PATENT DOCUMENTS

| | | | |
|---|---|---|---|
| 6,177,959 B1 * | 1/2001 | Bril | 348/521 |
| 6,185,314 B1 * | 2/2001 | Crabtree et al. | 382/103 |
| 6,285,995 B1 * | 9/2001 | Abdel-Mottaleb et al. | 707/3 |
| 6,463,178 B1 * | 10/2002 | Kondo et al. | 382/232 |
| 6,625,319 B1 | 9/2003 | Krishnamachari | 382/238 |
| 6,643,643 B1 * | 11/2003 | Lee et al. | 707/5 |
| 6,813,395 B1 * | 11/2004 | Kinjo | 382/305 |
| 6,914,626 B2 * | 7/2005 | Squibbs | 348/231.3 |
| 6,950,535 B2 * | 9/2005 | Sibayama et al. | 382/113 |
| 7,016,532 B2 * | 3/2006 | Boncyk et al. | 382/165 |
| 7,103,237 B2 * | 9/2006 | Labelle | 382/305 |
| 7,289,806 B2 * | 10/2007 | Morris et al. | 455/432.3 |
| 7,376,265 B2 * | 5/2008 | Huang | 382/166 |
| 2002/0004415 A1 * | 1/2002 | Ito et al. | 455/566 |
| 2002/0075310 A1 | 6/2002 | Prabhu et al. | 345/764 |
| 2005/0113113 A1 * | 5/2005 | Reed | 455/456.3 |
| 2005/0162523 A1 * | 7/2005 | Darrell et al. | 348/211.2 |

FOREIGN PATENT DOCUMENTS

| | | |
|---|---|---|
| EP | 1 170 953 A3 | 1/2002 |
| EP | 1 209 619 A2 | 5/2002 |

OTHER PUBLICATIONS

Nokia 7650 User's Guide, Jun. 1998, 6 pages.

* cited by examiner $$AE(d_x, d_y) = \sum_{i=0}^{15} \sum_{j=0}^{15} |f(i,j) - g(i-d_x, j-d_y)|$$

METHOD AND APPARATUS TO PROVIDE EFFICIENT MULTIMEDIA CONTENT STORAGE

TECHNICAL FIELD

This invention relates generally to the efficient use of content storage in multimedia devices and, more specifically, relates to techniques for capturing and storing images in systems having limited memory storage capabilities such as digital cameras and devices containing digital cameras, including modern cellular telephones and personal communicators.

BACKGROUND

The use of digital cameras is spreading rapidly, and the capabilities and performance of digital photography equipment (including digital cameras and so-called camera phones) is also increasing rapidly. The image resolution of camera phones is expected to follow an exponential growth curve, with 2-megapixel (two million picture elements) image resolution cameras now available in camera phones.

The increasing camera resolution imposes more stringent requirements on image storage subsystems. For example, a picture taken by a 4-megapixel camera can require up to 2 MB (two million bytes) of storage space. On the other hand, although the capacity of memory cards (the subsystem responsible for image storage) is also increasing, there are many occasions that the memory card becomes full before the stored images can be transferred to another device (e.g., to a personal computer or PC). In these situations, new pictures cannot be taken due to lack of storage. When the memory card is full, the typical consumer faces a difficult choice of purchasing at least one additional expensive memory card (which is not always feasible, depending on the user's location) or deleting one or more stored images.

Furthermore, digital cameras and camera phones are typically multi-purpose devices where a number of applications can be required to share a single memory card. For example, one commercially-available digital camera is capable of recording video for up to three minutes, at a data rate of approximately 10 MB/minute. Thus, the use of video recording substantially reduces the memory usable for photography. As it is expected that many camera phones will offer video recording capability in the near future, the same problems will be experienced.

File system compression has been used in operating systems to reduce memory (disk) usage. However, such systems do not address the problems considered herein, since image files are often typically compressed (using a lossy compression method such as JPEG compression) before being stored in the file system. As a result, they cannot be effectively further compressed using typical file compression tools.

Another type of conventional compression, known as cache-based compaction, uses the similarity of two web objects to reduce the amount of the network traffic. Cache-based compaction works as follows: a web client requests a URL via a web proxy. The proxy fetches the URL on behalf of the client. The proxy then computes the difference of the requested web object with the most similar web object currently cached in the web client, and transmits only the difference. The client then restores the requested web object by combining the cached object and the difference.

Version control systems are also known in the prior art, and are widely used in the software industry to track changes in source code. Version control systems may use a technique known as delta compression to compactly store a later version of a file by storing only the difference of the later file version relative to an earlier version of the file.

For various reasons explained below, these conventional file size reduction techniques are not suitable for use with image files generated by an image capture device, such as a digital camera that is used alone or as part of another device, such as a camera phone.

SUMMARY OF THE PREFERRED EMBODIMENTS

The foregoing and other problems are overcome, and other advantages are realized, in accordance with the presently preferred embodiments of these teachings.

Disclosed is a method and a device, that includes a programmed data processor, to process image data. The method includes, for a plurality n of files each containing image data representing one of n images, selecting one file as a base file; selecting as a target file an image data file that is contextually-related file to the base file; comparing the target file and the base file to determine differences therebetween; and storing the target file as a reduced file that is a representation of differences between the image data of the target file and the image data of the base file. An image data file is selected as being contextually-related to the base file based on at least an image capture location, and/or on an image capture time. An image data file can also be selected as being contextually-related to the base file based on a user input, such as by the user manually selecting a target image file. An image data file may also be selected as being contextually-related to the base file based on information received from an image capture device other than an image capture device that generated the image data file.

In a presently preferred, but non-limiting embodiment of this invention storing is performed in a memory device that is a part of a wireless communications device, such as a cellular telephone, or a personal communicator, or a personal digital assistant (PDA), or any other type of user device, equipment or terminal that includes a digital camera and some type of wireless (RF or optical) communications capability. In this case the method can further include transmitting the reduced file to a destination using a wireless link. The wireless link may include a cellular communication channel, or a short range RF (e.g., Bluetooth) or IR communications link.

However, it will be made apparent below that devices and equipment having wired communications capabilities, such as PCs connected to a data communications network through a wire or cable, can also benefit from the use of this invention. In general, this invention pertains also to computer programs executable by digital data processors, such as general purpose data processors.

In a non-limiting embodiment the comparing of the target and base files includes partitioning the target file into non-overlapping blocks of pixels; for each block in the target file, finding a best matching block in the base file; representing a block in the target file using a relative location of the best matching block in the base file and as a difference between the blocks; and encoding the difference between the blocks.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

This invention exploits the redundancy that can exist between some captured images to reduce the storage space for images. In this regard two images (as a minimum) may be considered to be contextually-related if, as non-limiting examples, one or more of the following criteria are true:

a) two images are captured within some short interval of time;
b) two images are captured at about the same location, with the image capture device being pointed at about the same azimuth and elevation; and
c) a user declares or specifies that two images are contextually-related.

If any one of these several criteria is true then there can exist a significant degree of similarity or redundancy among image files stored in a memory, such as the memory of a digital camera or a digital camera phone. This invention exploits this potential for image similarity by using one image file as a "base" or "reference", and by compressing another image file by storing only the difference between the two image files. Two related aspects of this invention relate to identifying image files that are most similar to each other (those that are contextually-related); and performing inter-image compression.

Figure 1:
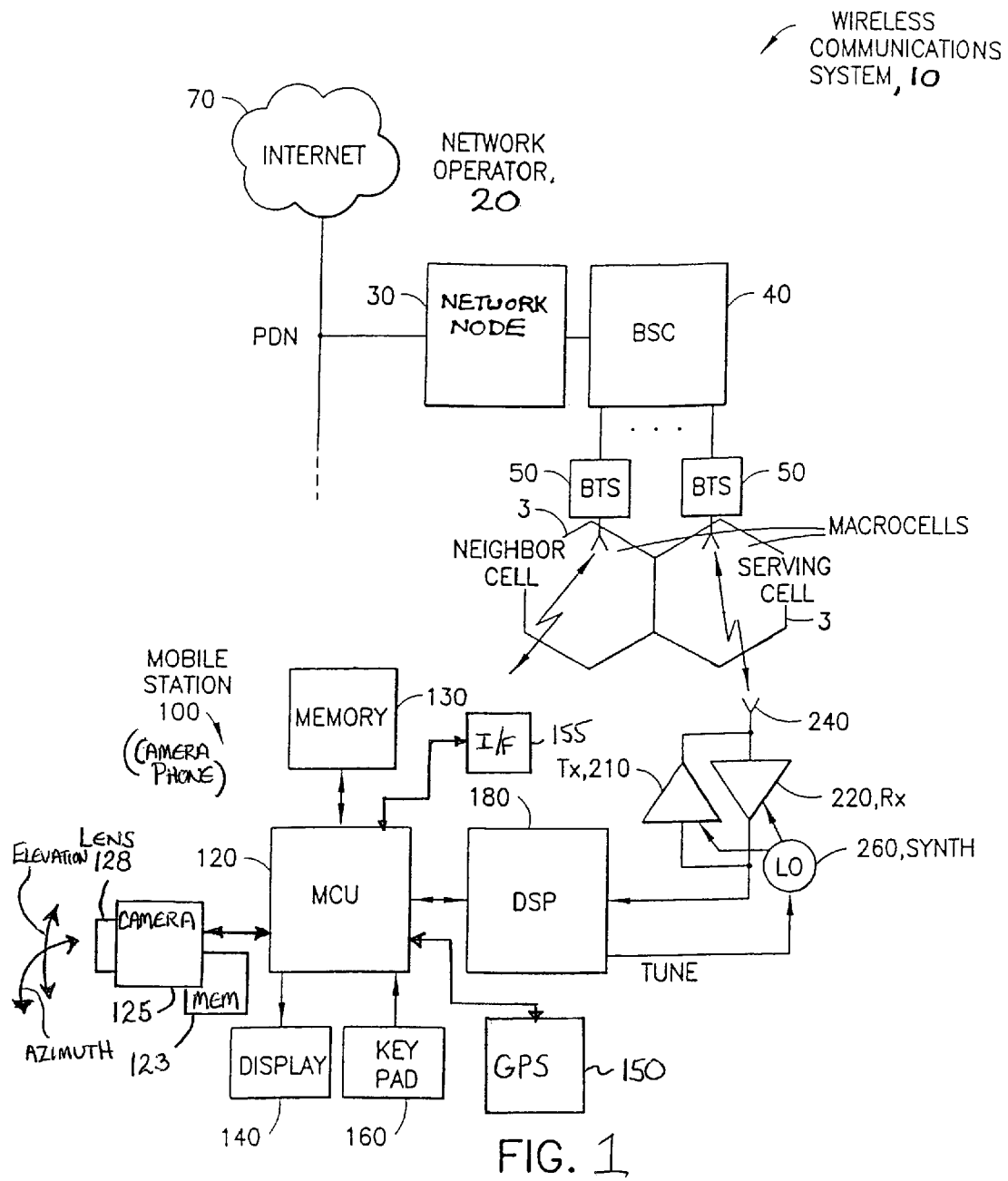
FIG. 1 is a simplified block diagram of a camera phone and related wireless system that is suitable for practicing this invention.

Before describing this invention in further detail, reference is first made to FIG. 1 for showing an embodiment of a wireless communications system 10 that includes a cellular telephone or mobile station 100 that includes a digital camera 125, also referred to herein as a camera phone. However, while described in the context of this presently most-preferred embodiment, it should be appreciated that the teachings of this invention can be applied to any device that contains a digital camera, as well as to digital cameras per se.

FIG. 1 shows a simplified block diagram of an embodiment of the wireless communications system 10 that is suitable for practicing this invention. The wireless communications system 10 includes at least one of the mobile stations (MSs) 100. The mobile station 100 may be a handheld radiotelephone, such as a cellular telephone or a personal communicator. The mobile station 100 could also be contained within a card or module that is connected during use to another device, or that is wearable by the user.

FIG. 1 also shows an exemplary network operator 20 having, for example, a node 30 for connecting to a telecommunications network, such as a Public Packet Data Network or PDN, at least one base station controller (BSC) 40 or equivalent apparatus, and a plurality of base transceiver stations (BTS) 50, also referred to as base stations (BSs), that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. A cell 3 is associated with each BTS 50, where one cell will at any given time be considered to be a serving cell, while an adjacent cell(s) will be considered to be a neighbor cell. Smaller cells (e.g., picocells) may also be available.

The air interface standard can conform to any suitable standard or protocol, and may enable both voice and data traffic, such as data traffic enabling Internet 70 access and web page downloads. As an example, the air interface standard may be compatible with a code division multiple access (CDMA) air interface standard, such as one known as cdma2000, although this is not a limitation upon the practice of this invention.

The mobile station 100 typically includes a control unit or control logic, such as a microcontrol unit (MCU) 120 having an output coupled to an input of a display 140 and an input coupled to an output of a keyboard or keypad 160. The MCU 120 is assumed to include or be coupled to some type of a memory 130, including a non-volatile memory for storing an operating program and other information, as well as a volatile memory for temporarily storing required data, scratchpad memory, received packet data, packet data to be transmitted, and the like. The operating program is assumed, for the purposes of this invention, to enable the MCU 120 to execute the software routines, layers and protocols required to implement the methods in accordance with this invention, as well as to provide a suitable user interface (UI), via display 140 and keypad 160, with a user. Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as a wireless transceiver that includes a transmitter 210 and a receiver 220, both of which are coupled to an antenna 240 for communication with the network operator. At least one local oscillator, such as a frequency synthesizer (SYNTH) 260, is provided for tuning the transceiver. Data, such as digitized voice and packet data, is transmitted and received through the antenna 240.

In this invention the MS 100 includes the camera 125 having a fixed or moveable lens (e.g., a zoom lens) 128. The camera 125 may also include a separate memory (MEM) 123 for the local storage of captured images, or the memory 130 may be used for this purpose. The image memory 123 may be embodied as a modular and detachable device, enabling a full memory device to be removed and replaced with an empty memory device.

The MS 100 may also include a location determining device or sub-system, such as global satellite system (GPS) receiver 150. The MS 100 may also include short range communication capability, such as low power RF (e.g., a Bluetooth) interface and/or an optical (e.g., an IR) interface, shown collectively as the interface (I/F) 155. In general, the I/F 155 may comprises a second wireless transceiver, either RF or IR, for enabling local communications capability for the MS 100. Alternatively, the I/F 155 may comprise a wired transceiver interface, such as a high speed serial or parallel data link. It is noted that in some devices all wireless communication may take place through the interface 155 (e.g., all wireless communications may be Bluetooth-enabled), such as in non-camera phone devices.

Having thus described one suitable but non-limiting embodiment of a camera phone 100 in which to practice this invention, it is noted that photographers typically take a number of pictures of the same object under different lighting, focus, composition and other conditions in order to obtain the best result. These pictures usually bear substantial similarity with each other. Photographers then typically select the best picture using a PC or other display-capable device after they return to the studio or home. As a result, the camera must store all of these pictures, even though the corresponding image files exhibit a significant amount redundancy. For example, there may be five pictures of the same object taken from the same vantage point, but with five different illumination conditions. In addition, non-professional consumer photographers often take multiple pictures of a similar composition or background. For example, two friends may take turns taking pictures of each other with some landmark or landscape in the background. These pictures, and the corresponding image files, can also exhibit significant redundancy, i.e., they can be contextually-related.

There are several possible techniques for identifying contextually-related image files. These include, but need not be limited to, the following exemplary techniques.

A) Manual selection by the user. The user may manually specify a set of image files having members that are similar and are thus suitable for being compressed using inter-image compression in accordance with an aspect of this invention. Although simple, this technique requires user input, a suitable user interface, and may be inconvenient and intrusive to implement.

B) Exhaustive automatic comparison between all image files. This algorithmic technique, based on image processing software, although unobtrusive to the user, may be too computationally expensive to be achieved in a device having limited computational and power resources, such as a battery-powered digital camera or the camera phone 100.

C) Employ additional or supplemental information to facilitate the process of identifying similar and contextually-related image files. Examples of supplemental information can include, but need not be limited to, the following.

C1) If the location of where each image file is captured is available, then the two image files captured at the same location are more likely to be similar than two image files captured at different locations. Location information can be made available in the camera phone by the means of the GPS receiver 150, and/or by cellular, wireless local area network (WLAN) and other locating technologies. To supplement the location information it may be desirable to also provide a system that outputs azimuth information, such as a digital compass, and possibly also the elevation of the line-of-sight (LOS) of the camera 125. An accelerometer can be used for this purpose to give an indication of the inclination of the camera phone 100 relative to the local normal. Alternatively, if the lens is 128 can be pointed in different directions then the current pointing direction can also be made available. The azimuth and/or elevation information can be used to supplement the location information, and if either or both are available may be considered to form a part of the location information. In general, it is assumed that two image files that are captured at the same location, with the same camera pointing direction azimuth and elevation, are more likely to be contextually related than two image files captured at the same location, but with the camera 125 pointed in two different directions (e.g., one picture taken pointing North and a second taken pointed East), or with the camera 125 pointed in different elevation directions (e.g., one picture taken with the lens 128 pointed down at 45 degrees from the local horizontal, while the second picture is taken with the lens 128 pointed up at 45 degrees).

C2) If the time when an image file is created is available, then two image files captured within a short period of time are more likely to be contextually-related. Time of day (TOD) information is typically available from digital cameras and, if not, may be made available external to the camera 125, such as by using a TOD clock maintained by the MCU 120, or one that is maintained external to the camera phone 100.

C3) Other types of supplemental information can also be used. For example, if a group is traveling together, and if group members have Bluetooth-enabled camera phones 100, i.e., camera phones having short-range RF (or IR) communication capabilities with one another, then such information can be recorded at the time of image capture and later used as guidance for image comparison. This type of information can be used as an aid in identifying the same or similar foreground object(s) (the figures or human faces) among different pictures.

The inter-image compression can be performed in various ways. The compression may be lossless or lossy, and may operate in the time domain or in the transformation domain. Specifically, some concepts used in motion picture compression, such as inter-frame compression and motion compensation, may be used to reduce the inter-image redundancy. One difference between this invention and motion picture compression, however, is that the invention does not require that two images have a temporal relationship to each other. In contrast, there are typically strict timing constraints imposed between two frames compressed using inter-frame compression in video compression. Also, this invention may include a process of selecting which image to use as a base, which is not done in conventional motion picture compression. Thus, "motion compensation" is used herein merely to encode the difference between images efficiently, as there may not in fact be any physical movement between the base image and an image being compared to the base image.

This invention differs from conventional file system compression that typically operates to compress a file by reducing the redundancy within the file. In contrast, the image file compression of this invention reduces inter-file redundancy. In addition, and as was mentioned previously, file system compression techniques are generally not effective for pre-compressed data, such as JPEG images.

This invention differs from conventional cache-based compaction in several significant ways as well. First, this invention requires only one device, while two devices (the proxy and the client) are involved in cache-based compaction. Second, the information used in the two techniques to aid in identifying similarity is quite different. In cache-based compaction, the only information used is the similarity in the URL, while this invention is capable of using a richer and more varied set of information, such as image capture location and/or time, among others.

In distinction to the conventional version control systems that were mentioned above, in this invention there is no notion of "different versions of the same file"; indeed, images are not acquired by manipulating a known file. Thus, the use of delta compression is not appropriate. Also, the text-based compression algorithms used in version control systems are not designed to work with image data.

In the preferred embodiment of this invention the image file compression operation is performed by software executed by the MCU 120, or by the DSP 180, or by a processor that is internal to the camera 125. The program may run periodically (e.g., every hour) or it may be event-triggered (e.g., when the image memory 123 is 80% full). Alternatively, a user may run the program manually. This invention may also be implemented through the use of a computer program that is executed by at least one general purpose computer.

An embodiment of a technique is now described to compress one image (B), also referred to as a target file, based on another image (A), also referred to as a base file. Note that it is preferred to deal with blocks of pixels in each image.

Figures 2, 3:
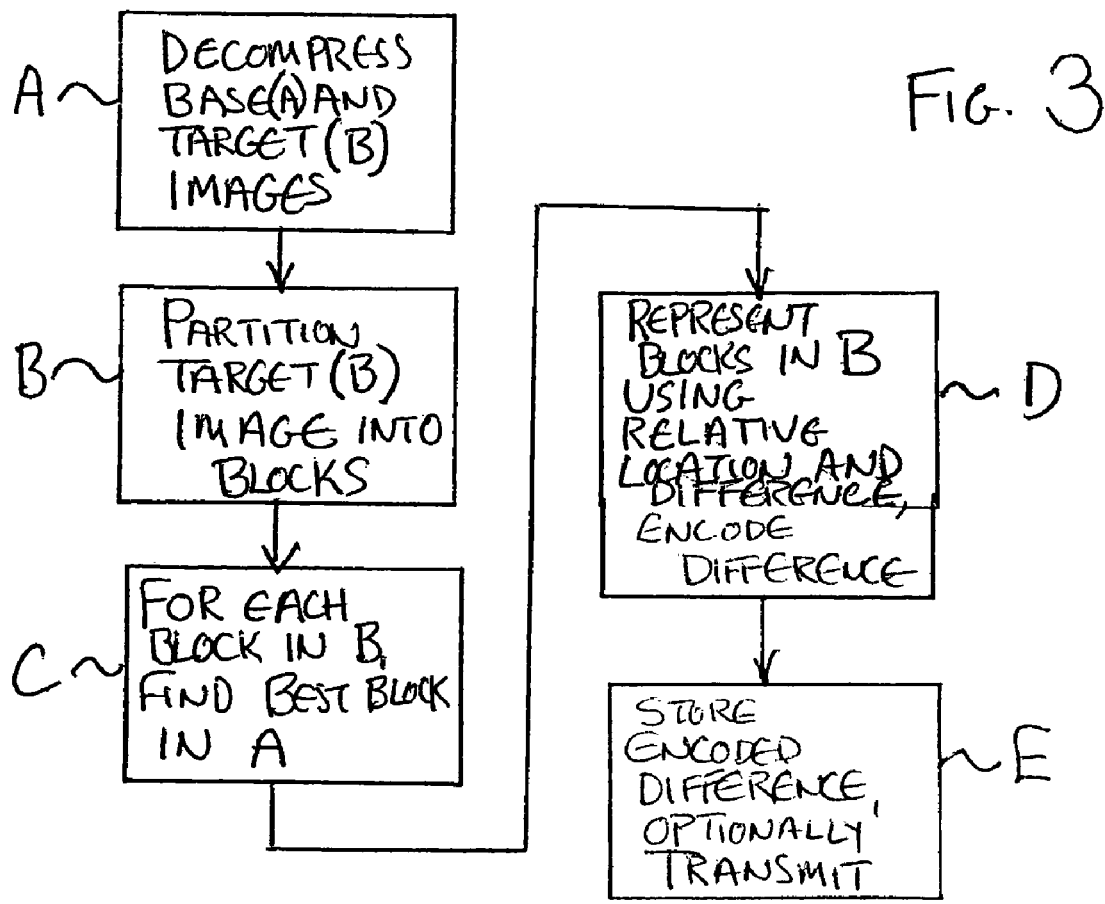
FIG. 2 shows a mathematical equation that is referred to in a discussion of a motion-compensation prediction technique that may be used to compress image files in accordance with this invention.
FIG. 3 is a logic flow diagram of an image compression technique.

Suitable block sizes may be, but are not limited to, 4×4 pixels, 8×8 pixels and 16×16 pixels. Reference is also made to the logic flow diagram of FIG. 3, which may also be viewed as a block diagram of interconnected circuit elements and/or logical units for performing the compression task. Combinations of software elements, circuit elements and/or logical units may also be employed.

Step A. Decompress (if already compressed) images A and B readout from the image memory 123.

Step B. Partition B into non-overlapping blocks of pixels (e.g. into non-overlapping blocks of 16×16 pixels).

Step C. For each block in image B, find the best matching block in image A. This procedure can proceed in a manner similar to a motion compensation technique that is described in: http://icsl.ee.washington.edu/~woobin/papers/General/node5.html.

More specifically, motion-compensated prediction assumes that a current image may be locally modeled as a translation of the images of some previous time. In the MPEG standard, each image is divided into blocks of 16×16 pixels, referred to as a macroblock. Each macroblock is predicted from the previous or future frame, by estimating the amount of motion in the macroblock during the frame time interval. The MPEG syntax specifies how to represent the motion information for each macroblock. It does not, however, specify how such vectors are to be computed. Due to the block-based motion representation, many implementations use block-matching techniques, where the motion vector is obtained by minimizing a cost function measuring the mismatch between the reference and the current block. Although any cost function can be used, a most widely-used choice is the absolute difference (AE) defined as in the Equation shown in FIG. 2. In this equation, f(i,j) represents a block of 16×16 pixels (a macroblock) from the current image, and g(i,j) represents the same macroblock from a reference image. The reference macroblock is displaced by a vector $(d_x, d_y)$ representing the search location. To determine the best matching macroblock that produces a minimum mismatch error, AE is calculated at several locations in the search range. The conceptually simplest, but the most compute-intensive search method, is known as the full search or exhaustive search. This search procedure evaluates the AE at every possible pixel locations in the search area. In order to reduce the computational complexity, algorithms having a reduced number of search points have been developed. One such algorithm is known as a Three-Step-Search (TSS). This algorithm first evaluates the AE at the center and eight surrounding locations of a 32×32 search area. The location that produces the smallest AE then becomes the center of the next stage, and the search range is reduced by half. This sequence is repeated three times.

Step D. Represent the block in B using the relative location of the matching block in A and the difference between blocks B and A. Motion compensation, a method used in MPEG to encode and decode the difference, is described below. It is noted, however, that other lossy and lossless encoding methods can be used to encode the difference, and are within the scope of this invention.

When using motion compensation in MPEG, the difference between two images, which may be referred to as a prediction error, may be encoded in a manner similar to the JPEG technique (DCT, quantization, followed by entropy coding). Reference may be had, as an example, to a publication "MPEG Digital Video-Coding Standards", T. Sikora, IEEE Signal Processing Magazine, September 1997, pgs. 82-99. Briefly, a first frame in video sequence is encoded in an interframe coding mode (I-picture), and each subsequent frame is coded using interframe prediction (P-pictures), and only data from the nearest previously coded I-picture or P-picture is used for prediction. For coding P-pictures, the previously I- or P-picture frame N-1 is stored in a frame store (FS) in both the encoder and the decoder. Motion compensation is performed on a macroblock basis, and one motion vector is estimated between frame N and frame N-1 for a particular macroblock to be encoded. These motion vectors are coded and transmitted to the receiver. The motion-compensated prediction error is calculated by subtracting each pel in a macroblock with its motion-shifted counterpart in the previous frame. An 8×8 discrete cosign transform (DCT) is then applied to each of the 8×8 blocks contained in the macroblock followed by quantization (Q) of the DCT coefficients with subsequent run-length coding and entropy coding (VLC).

Step E. Store the encoded difference obtained from Step D in the image memory 123 as a compressed or reduced image data file.

When it is desired to display the image B, the foregoing process is reversed to obtain the original image B.

Note that the reduced image B not only requires less storage space in the image memory 123, but the transfer of the reduced image B over the wireless link (either the cellular link or a local link (e.g., a Bluetooth link)) requires less bandwidth and can be achieved in a more rapid manner than would be the case with the uncompressed, original target image B. In this case the decompression operation can take place at the destination device or system, assuming that the parameters necessary for decompressing the image are also transferred. It is assumed in this case that the receiving device has a copy of the base image in order to decode the target image.

The foregoing procedure is illustrative of a suitable technique for compressing images with slight movements, and is similar to MPEG. For images that can produced as a result of zooming in/out, one may resample the image with the higher resolution (the "zoomed-in" image) to represent part of the other image.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent image compression algorithms may be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method, comprising:

selecting one file of a plurality of image data files, each image data file containing image data representing an image, as a base file;

selecting as a target file an image data file that is a contextually-related file to the base file using supplemental information other than image content;

comparing the target file and the base file to determine differences therebetween, wherein comparing the target file comprises comparing the image data in the target file and image data in the base file on a block-by-block basis, each of the blocks comprising a plurality of pixels, and determining mismatches between selected blocks in the target file and selected blocks in the base file, the determining using a cost function calculated using a reduced number of pixel locations in the selected blocks relative to an exhaustive search that uses all pixel locations in the selected blocks; and storing the target file as a reduced file that is a representation of differences between the image data of the target file and the image data of the base file.

2. A method as in claim 1, where an image data file is selected as being contextually-related to the base file based on at least an image capture location.

3. A method as in claim 1, where an image data file is selected as being contextually-related to the base file based on at least an image capture time.

4. A method as in claim 1, where an image data file is selected as being contextually-related to the base file based on a user input.

5. A method as in claim 1, where an image data file is selected as being contextually-related to the base file based on information received from an image capture device other than an image capture device that generated the image data file.

6. A method as in claim 1, where storing is performed in a memory device that comprises a part of a wireless communications device.

7. A method as in claim 6, further comprising transmitting the reduced file to a destination using a wireless link.

8. A method as in claim 7, where the wireless link comprises a short range radio frequency (RF) or infrared (IR) communications link.

9. A method as in claim 1, where comparing comprises:
partitioning the target file into non-overlapping blocks of pixels;
for each block in the target file, finding a best matching block in the base file;
representing a block in the target file using a relative location of the best matching block in the base file and as a difference between the blocks; and
encoding the difference between the blocks.

10. An electronic device comprising at least one data processor coupled to at least one memory for storing a program and a plurality of image data files each containing image data representing an image, said data processor operating under control of the stored program to cause the portable electronic device to select one of the plurality of image data files as a base file; to select as a target file an image data file that is a contextually-related file to the base file using supplemental information other than image content; to compare the target file and the base file to determine differences therebetween and to store the target file in the image memory as a reduced file that is a representation of differences between the image data of the target file and the image data of the base file, wherein the at least one data processor is further operable to cause the portable electronic device, when comparing the target file, to compare the image data in the target file and image data in the base file on a block-by-block basis, each of the blocks comprising a plurality of pixels, and to determine mismatches between selected blocks in the target file and selected blocks in the base file, the determination using a cost function calculated using a reduced number of pixel locations in the selected blocks relative to an exhaustive search that uses all pixel locations in the selected blocks.

11. A device as in claim 10, where said at least one data processor selects an image data file to be contextually-related to the base file based on at least an image capture location.

12. A device as in claim 10, where said at least one data processor selects an image data file to be contextually-related to the base file based on at least an image capture time.

13. A device as in claim 10, where said at least one data processor selects an image data file to be contextually-related to the base file based on at least a user input.

14. A device as in claim 10, where said at least one data processor selects an image data file to be contextually-related to the base file based on at least information received from an image capture device other than an image capture device that generated the image data file.

15. A device as in claim 10, further comprising a transmitter to transmit the reduced file to a destination using a wireless link.

16. A device as in claim 15, where the wireless link comprises a short range radio frequency (RF) or infrared (IR) communications link.

17. A device as in claim 10, where said at least one data processor operates, when comparing the target file and the base file, to cause the portable electronic device to partition the target file into non-overlapping blocks of pixels; to find a best matching block in the base file for each block in the target file; to represent a block in the target file using a relative location of the best matching block in the base file and as a difference between the blocks and to encode the difference between the blocks.

18. A device as in claim 10, wherein a selected one of the at least one memories stores the plurality of image data files, and wherein the selected memory is detachable from said device.

19. A camera phone, comprising:
a digital image capture device coupled to an image storage memory configured to store a plurality of image data files, each containing image data representing an image; and
at least one processor coupled to said image storage memory and operable to perform context-based image compression; to select an image data file as a base file; to select as a target file an image data file that is contextually-related to the base file using supplemental information other than image content; to process the target file and the base file to determine differences therebetween and to store a processed target file in the image storage memory as a file of smaller size than the size of the target file, wherein the at least one processor is further operable, when comparing the target file, to compare the image data in the target file and image data in the base file on a block-by-block basis, each of the blocks comprising a plurality of pixels, and to determine mismatches between selected blocks in the target file and selected blocks in the base file, the determination using a cost function calculated using a reduced number of pixel locations in the selected blocks relative to an exhaustive search that uses all pixel locations in the selected blocks.

20. A camera phone as in claim 19, where said image storage memory is detachable from said camera phone.

21. A camera phone as in claim 19, where said at least one processor selects an image data file to be contextually-related to the base file based on at least an image capture location.

22. A camera phone as in claim 21, where the image capture location is determined by the camera phone.

23. A camera phone as in claim 21, further comprising a transceiver, and where the image capture location is determined external to said camera phone and is transmitted to said camera phone through said transceiver.

24. A camera phone as in claim 21, where the image capture location comprises an azimuthal pointing direction of said digital image capture device.

25. A camera phone as in claim 21, where the image capture location comprises an elevation angle of a pointing direction of said digital image capture device.

26. A camera phone as in claim 19, where said at least one processor selects an image data file to be contextually-related to the base file based on at least an image capture time.

27. A camera phone as in claim 19, where said at least one processor selects an image data file to be contextually-related to the base file based on at least a user input.

28. A camera phone as in claim 19, where said at least one processor selects an image data tile to be contextually-related to the base file based on at least information received from another camera phone.

29. A camera phone as in claim 19, further comprising a transceiver, and where said processed target file is transmitted from said camera phone through said transceiver.

30. A camera phone as in claim 29, further comprising a transceiver, and where said transceiver comprises one of a short range radio frequency or infrared communications transceiver.

31. A camera phone as in claim 19, further comprising a program, and where the image processor operates under control of the program.

32. A computer program stored on a non-transitory computer-readable medium encoded with said computer program and configured to perform operation on a portable electronic device and where the computer program further comprises computer-executable instructions responsive to a plurality of image data files, each containing image data representing an image, to select an image data file as a base file; to select as a target file an image data file that is contextually-related to the base file using supplemental information other than image content; to process the target file and the base file to determine differences therebetween and to store a processed target file as a file of smaller size than the size of the target file, wherein the computer-executable instructions are further responsive to the image data files, when comparing the target file, to compare the image data in the target file and image data in the base file on a block-by-block basis, each of the blocks comprising a plurality of pixels, and to determine mismatches between selected blocks in the target file and selected blocks in the base file, the determination using a cost function calculated using a reduced number of pixel locations in the selected blocks relative to an exhaustive search that uses all pixel locations in the selected blocks.

33. A computer program as in claim 32, where an image data file is selected to be contextually-related to the base file based on at least an image capture location.

34. A computer program as in claim 33, where the image capture location comprises an azimuthal pointing direction of an image capture device.

35. A computer program as in claim 33, where the image capture location comprises an elevation angle of a pointing direction of an image capture device.

36. A computer program as in claim 32, where an image data file is selected to be contextually-related to the base file based on at least one of an image capture time or a user input.

37. A computer program as in claim 32, where said computer program is executed by a data processor that comprises a part of a wireless communications device that includes a digital image capture device.

\* \* \* \* \*

UNITED STATES PATENT AND TRADEMARK OFFICE
CERTIFICATE OF CORRECTION

PATENT NO. : 7,805,024 B2  Page 1 of 1
APPLICATION NO. : 10/839672
DATED : September 28, 2010
INVENTOR(S) : Wu It is certified that error appears in the above-identified patent and that said Letters Patent is hereby corrected as shown below:

Claim 28, col. 11, line 14 delete "tile" and insert --file--.

Signed and Sealed this

Twenty-third Day of November, 2010

David J. Kappos
*Director of the United States Patent and Trademark Office*